Feb. 16, 1937.    C. M. UNDERWOOD ET AL    2,071,050
COMPOSITE METAL ARTICLE AND METHOD OF JOINING THE PARTS THEREOF
Filed June 9, 1934
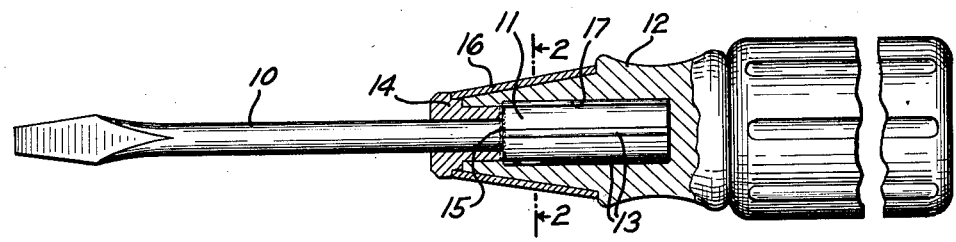
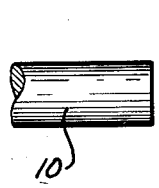
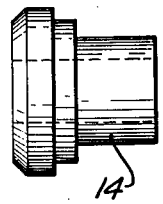
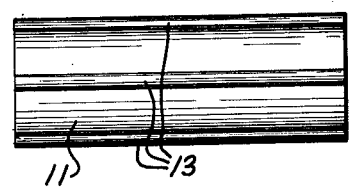
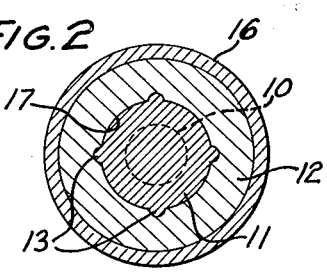
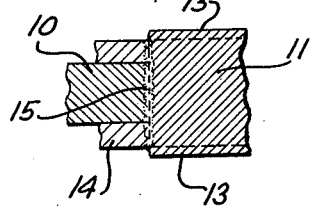
INVENTORS
C. M. UNDERWOOD
A. L. VAN NEST
BY H. A. Whitehorn
ATTORNEY Patented Feb. 16, 1937

2,071,050

UNITED STATES PATENT OFFICE 2,071,050

COMPOSITE METAL ARTICLE AND METHOD OF JOINING THE PARTS THEREOF

Carl M. Underwood, Newton Center, Mass., and Arden L. Van Nest, Oak Park, Ill., assignors to Western Electric Company, Incorporated, New York, N. Y., a corporation of New York Application June 9, 1934, Serial No. 729,742

1 Claim. (Cl. 279—102)

This invention relates to composite metal articles and methods of joining the parts thereof, and more particularly to composite articles wherein the parts are joined end to end, and methods of joining the same.

Objects of this invention are to provide an improved composite metal article and an improved and efficient method of producing an end to end joint between the parts thereof.

In accordance with the above objects, wherein one embodiment of the invention is applied to the production of composite screw driver blades comprising a blade portion and a shank portion integrally joined in end to end relation, the blade portion is made smaller in cross-sectional area than the shank portion, and a sleeve is fitted tightly upon the inner end of the blade portion, its inner end having a diameter substantially the same as the diameter of the shank portion. The end area of the shank portion is then electrically welded to the end area of the blade portion and to the annular end area of the sleeve to form an integral sturdy unit.

Other objects and advantages of this invention will more fully appear from the following description taken in connection with the accompanying drawing, wherein Fig. 1 is a fragmentary side view, partly in section, of a screw driver comprising a composite blade embodying the features of and produced in accordance with the method of this invention;

Fig. 2 is a transverse section, on an enlarged scale, taken on the line 2—2 of Fig. 1;

Fig. 3 is a detached fragmentary enlarged side view of the inner end of the screw driver blade portion;

Fig. 4 is a detached enlarged side view of the sleeve which is fitted upon the inner end of the blade portion;

Fig. 5 is a detached enlarged side view of the shank portion of the blade, and

Fig. 6 is a fragmentary enlarged vertical longitudinal section of the blade portion, sleeve and shank portion after being welded into an integral unit and with the welding flash removed.

A composite screw driver blade embodying the features of this invention may be produced according to the following method. Referring to the drawing, particularly to Figs. 3, 4, and 5, 10 indicates a screw driver blade portion formed from tool steel rod stock having a relatively high carbon content, such as is used in tools of this type. The blade portion 10 is provided with a shank portion 11 which is of larger cross-sectional area than the blade and in the completed screw driver, as shown in Fig. 1 is anchored in a handle 12, the shank portion 11 being of a suitable length cut from soft steel rod stock having a relatively low carbon content as compared to the blade to reduce manufacturing costs. The rod stock from which the shank portion 11 is cut, in the present embodiment, is formed with four equally spaced longitudinal ribs or fins 13 serving in the completed screw driver to anchor the handle to the shank portion to prevent turning therebetween.

Surrounding the inner end of the blade portion 10 and having a tight fit thereon is a shouldered sleeve or collar 14 which like the shank portion 11 is made from soft steel of relatively low carbon content to reduce costs. At its inner and smaller end the sleeve 14 has an outside diameter substantially the same as the shank portion 11. The combined end areas of the blade and sleeve portions, which are assembled in flush relation, equal the end area of the shank portion. After assembling the sleeve 14 on the blade portion 10, the two members being substantially flush at their inner ends, they are brought into abutting parallel end to end relation under suitable pressure with the shank portion 11 and in axial alinement by means of a suitable fixture, not shown. Thereafter the inner ends of the blade portion 10 and the surrounding sleeve 14 are integrally united to the abutting end of the shank portion 11 by electric welding effected by the usual methods employed in butt welding. The usual flash of metal at the point of weld is then removed by grinding, or otherwise, and the united parts along their welded areas then appear as shown fragmentarily and in section in Fig. 6, the line of welding being indicated at 15.

Due to the equal alined end areas of the shank portion 11 and the blade portion 10 taken with the annular end area of the surrounding sleeve 14, one portion of the composite blade does not sink into the other while the metals are in a plastic or semifluid condition, due to the welding current, but remain flush. The inner end of the sleeve 14 welded to the shank portion 11 provides an annularly-shaped abutment to absorb lateral thrusts of the blade portion 10 of the composite screw driver blade when in use. Also, since the blade and shank portions 10 and 11, respectively, must be assembled in axial alinement the referred to equal end areas serve to facilitate the checking thereof for this alinement.

The outer or operative end of the blade portion is then finished by suitable forging and machining operations to the shape shown in Fig.

1. Thereafter the finished composite blade is assembled with the handle 12, which may be made of suitable wood or other material. The handle 12 carries at one end a tapered metal ferrule 16 driven onto a similarly shaped peripheral surface of the handle and engaging at its inner end an annular surface of the handle. Formed axially in the handle 12 along the tapered end is an aperture 17 of a suitable diameter and length for receiving the inner end of the composite blade. The diameter of the aperture 17 is less than the overall diameter of the shank portion 11, including the fins 13 (Fig. 2), so that when the handle is driven onto the composite blade the fins will cut into the material of the handle and effectively anchor the handle to the blade to prevent turning therebetween. During the driving of the handle 12 onto the blade, the ferrule 16 prevents the handle from splitting. As clearly shown in the completed screw driver (Fig. 1) the outer end surfaces of the ferrule 16 and the handle 12 abut annular surfaces formed on the shouldered sleeve 14.

From the above description it will be apparent that by practicing the method of this invention a composite screw driver blade may be economically and efficiently produced, the parts being integrally united in such a manner that a sturdy and durable composite blade is effected.

The foregoing describes but one embodiment of a composite metal article produced in accordance with the method of this invention. The invention is capable of many other applications and embodiments not described above, and it is, therefore, desired that the scope of the invention be not limited except by the scope of the appended claim.

What is claimed is:

A screw driver comprising a handle, a cylindrical shank of low carbon steel embedded in the handle and secured thereto with longitudinal fins on the periphery of the shank, a blade portion of high carbon steel having a smaller cross section than the cylindrical shank welded to the end of the shank in axial alignment therewith, a stepped collar of low carbon steel encircling the blade and welded to the end of the cylindrical shank and to the blade, said collar having a cylindrical portion of the same diameter as the shank to support the handle and having an enlarged ring at one end, and a conical metal ferrule engaging the end portion of the handle surrounding the welded joint and supported by the enlarged ring on the collar.

CARL M. UNDERWOOD.
ARDEN L. VAN NEST.